United States Patent
Ko et al.

(10) Patent No.: US 8,429,425 B2
(45) Date of Patent: Apr. 23, 2013

(54) ELECTRONIC BACKUP AND RESTORATION OF ENCRYPTED DATA

(75) Inventors: Steve Ko, San Francisco, CA (US); Robert Ulrich, San Jose, CA (US)

(73) Assignee: Apple Inc., Cupertino, CA (US)

(*) Notice: Subject to any disclaimer, the term of this patent is extended or adjusted under 35 U.S.C. 154(b) by 124 days.

(21) Appl. No.: 11/760,615

(22) Filed: Jun. 8, 2007

(65) Prior Publication Data

US 2008/0307020 A1 Dec. 11, 2008

(51) Int. Cl.
*G06F 21/10* (2006.01)

(52) U.S. Cl.
USPC .......... 713/193; 713/165; 713/167; 707/640; 707/650; 707/653

(58) Field of Classification Search .......... 707/204, 707/600, 610; 713/165, 193, 182; 380/255, 380/259

See application file for complete search history.

(56) References Cited

U.S. PATENT DOCUMENTS

| | | | |
|---|---|---|---|
| 5,150,407 A * | 9/1992 | Chan | 713/178 |
| 5,150,473 A | 9/1992 | Zulch | |
| 5,163,148 A | 11/1992 | Walls | |
| 5,276,867 A | 1/1994 | Kenley et al. | |
| 5,369,570 A | 11/1994 | Parad | |
| 5,659,614 A * | 8/1997 | Bailey, III | 713/165 |
| 5,680,562 A | 10/1997 | Conrad et al. | |
| 5,736,974 A | 4/1998 | Selker | |
| 5,745,669 A | 4/1998 | Hugard et al. | |
| 5,754,178 A | 5/1998 | Johnston et al. | |
| 5,758,359 A | 5/1998 | Saxon | |
| 5,790,120 A | 8/1998 | Lozares et al. | |
| 5,802,175 A * | 9/1998 | Kara | 380/277 |
| 5,818,936 A * | 10/1998 | Mashayekhi | 713/167 |
| 5,819,032 A | 10/1998 | De Vries et al. | |
| 5,819,292 A | 10/1998 | Hitz et al. | |
| 5,831,617 A | 11/1998 | Bhukhanwala | |
| 5,832,526 A | 11/1998 | Schuyler | |
| 5,961,605 A | 10/1999 | Deng et al. | |
| 5,987,566 A | 11/1999 | Vishlitzky et al. | |
| 6,006,227 A | 12/1999 | Freeman et al. | |
| 6,023,506 A * | 2/2000 | Ote et al. | 713/165 |

(Continued)

FOREIGN PATENT DOCUMENTS

| | | |
|---|---|---|
| EP | 0629950 | 12/1994 |
| EP | 1152352 | 11/2001 |

(Continued)

OTHER PUBLICATIONS

Microsoft-TechNet, "Using Encrypting File System," Nov. 3, 2005, Microsoft, pp. 40.*

(Continued)

*Primary Examiner* — Luu Pham

(74) *Attorney, Agent, or Firm* — Womble Carlyle Sandridge & Rice LLP

(57) ABSTRACT

Systems and methods are provided for storing and restoring digital data. In some implementations, a method is provided. The method includes identifying an encrypted source disk image to be included in a backup operation, the encrypted disk image being encrypted with a first key and generating an encrypted backup disk image, the encrypted backup disk image being encrypted with a second key protected with a randomly generated password. Other embodiments of this aspect include corresponding systems, apparatus, computer program products, and computer readable media.

19 Claims, 6 Drawing Sheets

U.S. PATENT DOCUMENTS

| | | | |
|---|---|---|---|
| 6,097,313 A | 8/2000 | Takahashi et al. | |
| 6,112,318 A | 8/2000 | Jouppi et al. | |
| 6,134,660 A * | 10/2000 | Boneh et al. | 713/193 |
| 6,167,532 A | 12/2000 | Wisecup | |
| 6,188,405 B1 | 2/2001 | Czerwinski et al. | |
| 6,366,988 B1 * | 4/2002 | Skiba et al. | 707/203 |
| 6,396,500 B1 | 5/2002 | Qureshi et al. | |
| 6,397,308 B1 | 5/2002 | Ofek et al. | |
| 6,424,626 B1 | 7/2002 | Kidambi et al. | |
| 6,460,055 B1 | 10/2002 | Midgley et al. | |
| 6,574,733 B1 * | 6/2003 | Langford | 713/194 |
| 6,604,118 B2 | 8/2003 | Kleiman et al. | |
| 6,625,704 B2 | 9/2003 | Winokur | |
| 6,629,129 B1 | 9/2003 | Bookspan et al. | |
| 6,636,937 B2 | 10/2003 | Peter | |
| 6,638,313 B1 | 10/2003 | Freeman et al. | |
| 6,711,572 B2 | 3/2004 | Zakharov et al. | |
| 6,714,201 B1 | 3/2004 | Grinstein et al. | |
| 6,725,427 B2 | 4/2004 | Freeman et al. | |
| 6,728,735 B1 | 4/2004 | Fong | |
| 6,768,999 B2 | 7/2004 | Prager et al. | |
| 6,785,751 B1 | 8/2004 | Connor | |
| 6,785,786 B1 | 8/2004 | Gold et al. | |
| 6,857,001 B2 | 2/2005 | Hitz et al. | |
| 6,892,211 B2 | 5/2005 | Hitz et al. | |
| 6,901,493 B1 | 5/2005 | Maffezzoni | |
| 6,918,124 B1 | 7/2005 | Novik et al. | |
| 6,947,556 B1 * | 9/2005 | Matyas et al. | 380/29 |
| 6,948,039 B2 | 9/2005 | Biessener et al. | |
| 6,959,368 B1 | 10/2005 | St. Pierre et al. | |
| 7,072,916 B1 | 7/2006 | Lewis et al. | |
| 7,103,740 B1 | 9/2006 | Colgrove et al. | |
| 7,111,136 B2 | 9/2006 | Yamagami | |
| 7,133,902 B2 | 11/2006 | Saha et al. | |
| 7,134,026 B2 * | 11/2006 | Horiuchi et al. | 713/193 |
| 7,155,486 B2 | 12/2006 | Aoshima et al. | |
| 7,174,352 B2 | 2/2007 | Kleiman et al. | |
| 7,185,028 B2 | 2/2007 | Lechner | |
| 7,200,617 B2 | 4/2007 | Kibuse | |
| 7,222,194 B2 | 5/2007 | Kano et al. | |
| 7,257,717 B2 * | 8/2007 | Huang | 713/193 |
| 7,318,134 B1 | 1/2008 | Oliveira et al. | |
| 7,320,076 B2 * | 1/2008 | Caronni | 713/193 |
| 7,386,801 B1 | 6/2008 | Horvitz et al. | |
| 7,418,619 B1 | 8/2008 | Uhlmann et al. | |
| 7,434,177 B1 | 10/2008 | Ording et al. | |
| 7,440,125 B2 | 10/2008 | Maekawa et al. | |
| 7,483,693 B2 | 1/2009 | Lueng et al. | |
| 7,518,611 B2 | 4/2009 | Boyd et al. | |
| 7,558,930 B2 | 7/2009 | Kitamura et al. | |
| 7,590,668 B2 | 9/2009 | Kathuria et al. | |
| 7,600,133 B2 * | 10/2009 | Long et al. | 713/193 |
| 7,630,021 B2 | 12/2009 | Matsuzaka et al. | |
| 7,660,817 B2 | 2/2010 | Smith et al. | |
| 7,669,141 B1 | 2/2010 | Pegg | |
| 7,676,689 B1 | 3/2010 | Shioyama et al. | |
| 7,711,771 B2 | 5/2010 | Kirnos | |
| 7,836,311 B2 * | 11/2010 | Kuriya et al. | 713/185 |
| 7,860,839 B2 | 12/2010 | Cisler et al. | |
| 8,055,911 B2 * | 11/2011 | Feng et al. | 713/193 |
| 2001/0047368 A1 | 11/2001 | Oshinsky et al. | |
| 2002/0016912 A1 * | 2/2002 | Johnson | 713/165 |
| 2002/0023198 A1 | 2/2002 | Kokubun et al. | |
| 2002/0046220 A1 | 4/2002 | Freeman et al. | |
| 2002/0054158 A1 | 5/2002 | Asami | |
| 2002/0063737 A1 | 5/2002 | Feig et al. | |
| 2002/0080180 A1 | 6/2002 | Mander et al. | |
| 2002/0160760 A1 | 10/2002 | Aoyama | |
| 2002/0174283 A1 | 11/2002 | Lin | |
| 2003/0016248 A1 | 1/2003 | Hayes Ubillos | |
| 2003/0018878 A1 | 1/2003 | Dorward et al. | |
| 2003/0050940 A1 | 3/2003 | Robinson | |
| 2003/0063128 A1 | 4/2003 | Salmimaa et al. | |
| 2003/0065687 A1 | 4/2003 | Momiji et al. | |
| 2003/0097640 A1 | 5/2003 | Abrams et al. | |
| 2003/0122874 A1 | 7/2003 | Dieberger et al. | |
| 2003/0126247 A1 | 7/2003 | Strasser et al. | |
| 2003/0131007 A1 | 7/2003 | Schirmer et al. | |
| 2003/0135650 A1 | 7/2003 | Kano et al. | |
| 2003/0137540 A1 | 7/2003 | Klevenz et al. | |
| 2003/0167380 A1 | 9/2003 | Green | |
| 2003/0172937 A1 | 9/2003 | Faries et al. | |
| 2003/0195903 A1 | 10/2003 | Manley et al. | |
| 2003/0220949 A1 | 11/2003 | Witt et al. | |
| 2004/0044707 A1 * | 3/2004 | Richard | 707/204 |
| 2004/0066414 A1 | 4/2004 | Czerwinski et al. | |
| 2004/0073560 A1 | 4/2004 | Edwards | |
| 2004/0078641 A1 | 4/2004 | Fleischmann | |
| 2004/0088331 A1 | 5/2004 | Therrien et al. | |
| 2004/0125137 A1 | 7/2004 | Stata et al. | |
| 2004/0133575 A1 | 7/2004 | Farmer et al. | |
| 2004/0139396 A1 | 7/2004 | Gelernter et al. | |
| 2004/0143652 A1 | 7/2004 | Grannan et al. | |
| 2004/0163009 A1 | 8/2004 | Goldstein et al. | |
| 2004/0167942 A1 | 8/2004 | Oshinsky et al. | |
| 2004/0175000 A1 * | 9/2004 | Caronni | 380/285 |
| 2004/0193953 A1 | 9/2004 | Callahan et al. | |
| 2004/0199779 A1 * | 10/2004 | Huang | 713/193 |
| 2004/0199826 A1 | 10/2004 | Bertram et al. | |
| 2004/0210608 A1 | 10/2004 | Lee et al. | |
| 2004/0220980 A1 | 11/2004 | Forster | |
| 2004/0228493 A1 * | 11/2004 | Ma | 380/286 |
| 2004/0235523 A1 | 11/2004 | Schrire et al. | |
| 2004/0236769 A1 | 11/2004 | Smith et al. | |
| 2004/0236916 A1 | 11/2004 | Berkowitz et al. | |
| 2004/0236958 A1 * | 11/2004 | Teicher et al. | 713/193 |
| 2004/0267700 A1 | 12/2004 | Dumais et al. | |
| 2005/0010955 A1 | 1/2005 | Elia et al. | |
| 2005/0071390 A1 | 3/2005 | Midgley et al. | |
| 2005/0091596 A1 | 4/2005 | Anthony et al. | |
| 2005/0102695 A1 | 5/2005 | Musser | |
| 2005/0108253 A1 | 5/2005 | Metsatahti et al. | |
| 2005/0138081 A1 | 6/2005 | Alshab et al. | |
| 2005/0144135 A1 | 6/2005 | Juarez et al. | |
| 2005/0149577 A1 | 7/2005 | Okada et al. | |
| 2005/0165867 A1 | 7/2005 | Barton et al. | |
| 2005/0187992 A1 | 8/2005 | Prahlad et al. | |
| 2005/0204186 A1 | 9/2005 | Rothman et al. | |
| 2005/0216527 A1 | 9/2005 | Erlingsson | |
| 2005/0246398 A1 | 11/2005 | Barzilai et al. | |
| 2005/0262168 A1 | 11/2005 | Helliker et al. | |
| 2005/0262377 A1 | 11/2005 | Sim-Tang | |
| 2006/0026218 A1 | 2/2006 | Urmston | |
| 2006/0041823 A1 | 2/2006 | Wolfgang et al. | |
| 2006/0053332 A1 | 3/2006 | Uhlmann et al. | |
| 2006/0064444 A1 | 3/2006 | Van Ingen et al. | |
| 2006/0064634 A1 | 3/2006 | Dettinger et al. | |
| 2006/0080521 A1 | 4/2006 | Barr et al. | |
| 2006/0085792 A1 | 4/2006 | Traut | |
| 2006/0085817 A1 | 4/2006 | Kim et al. | |
| 2006/0088167 A1 * | 4/2006 | Bade et al. | 380/281 |
| 2006/0101384 A1 | 5/2006 | Sim-Tang et al. | |
| 2006/0106893 A1 | 5/2006 | Daniels et al. | |
| 2006/0117309 A1 | 6/2006 | Singhal et al. | |
| 2006/0137010 A1 | 6/2006 | Kramer et al. | |
| 2006/0143250 A1 | 6/2006 | Peterson et al. | |
| 2006/0156246 A1 | 7/2006 | Williams et al. | |
| 2006/0161861 A1 | 7/2006 | Holecek et al. | |
| 2006/0173848 A1 * | 8/2006 | Peterson et al. | 707/9 |
| 2006/0218363 A1 | 9/2006 | Palapudi | |
| 2006/0236406 A1 * | 10/2006 | Johnson | 726/27 |
| 2006/0248294 A1 | 11/2006 | Nedved et al. | |
| 2006/0253470 A1 | 11/2006 | Friedman et al. | |
| 2006/0288205 A1 * | 12/2006 | Linares | 713/165 |
| 2007/0027935 A1 | 2/2007 | Haselton et al. | |
| 2007/0030528 A1 | 2/2007 | Quaeler et al. | |
| 2007/0038884 A1 | 2/2007 | Campbell et al. | |
| 2007/0043790 A1 | 2/2007 | Kryger | |
| 2007/0070066 A1 | 3/2007 | Bakhash | |
| 2007/0078910 A1 | 4/2007 | Bopardikar | |
| 2007/0088702 A1 | 4/2007 | Fridella et al. | |
| 2007/0094312 A1 | 4/2007 | Sim-Tang | |
| 2007/0106978 A1 | 5/2007 | Felts | |
| 2007/0136389 A1 | 6/2007 | Bergant et al. | |
| 2007/0156772 A1 | 7/2007 | Lechner | |
| 2007/0168497 A1 | 7/2007 | Locker et al. | |
| 2007/0180268 A1 * | 8/2007 | Filimon et al. | 713/192 |

| | | | |
|---|---|---|---|
| 2007/0185879 A1 | 8/2007 | Roublev et al. | |
| 2007/0185922 A1 | 8/2007 | Kapoor et al. | |
| 2007/0192386 A1 | 8/2007 | Fries et al. | |
| 2007/0266007 A1 | 11/2007 | Arrouye et al. | |
| 2007/0271263 A1 | 11/2007 | Merrild | |
| 2007/0271303 A1 | 11/2007 | Menendez et al. | |
| 2007/0288536 A1 | 12/2007 | Sen et al. | |
| 2008/0016576 A1* | 1/2008 | Ueda et al. | 726/26 |
| 2008/0022393 A1* | 1/2008 | Waltermann et al. | 726/18 |
| 2008/0028007 A1 | 1/2008 | Ishii et al. | |
| 2008/0033922 A1 | 2/2008 | Cisler et al. | |
| 2008/0033969 A1 | 2/2008 | Koo et al. | |
| 2008/0034004 A1* | 2/2008 | Cisler et al. | 707/200 |
| 2008/0034011 A1 | 2/2008 | Cisler et al. | |
| 2008/0034013 A1 | 2/2008 | Cisler et al. | |
| 2008/0034017 A1 | 2/2008 | Giampaolo et al. | |
| 2008/0034018 A1 | 2/2008 | Cisler et al. | |
| 2008/0034019 A1 | 2/2008 | Cisler et al. | |
| 2008/0034039 A1 | 2/2008 | Cisler et al. | |
| 2008/0059894 A1 | 3/2008 | Cisler et al. | |
| 2008/0065663 A1 | 3/2008 | Farlee et al. | |
| 2008/0077808 A1* | 3/2008 | Teicher et al. | 713/193 |
| 2008/0082578 A1 | 4/2008 | Hogue et al. | |
| 2008/0091655 A1 | 4/2008 | Gokhale et al. | |
| 2008/0126441 A1 | 5/2008 | Cisler et al. | |
| 2008/0126442 A1 | 5/2008 | Cisler et al. | |
| 2008/0141029 A1* | 6/2008 | Culver | 713/165 |
| 2008/0177961 A1 | 7/2008 | McSharry et al. | |
| 2008/0208630 A1 | 8/2008 | Fors et al. | |
| 2008/0216011 A1 | 9/2008 | Gould | |
| 2008/0229037 A1 | 9/2008 | Bunte et al. | |
| 2008/0250342 A1 | 10/2008 | Clark et al. | |
| 2008/0285754 A1* | 11/2008 | Kezmann | 380/259 |
| 2008/0307000 A1 | 12/2008 | Paterson et al. | |
| 2008/0310628 A1* | 12/2008 | Fujioka et al. | 380/201 |
| 2009/0019291 A1* | 1/2009 | Murray | 713/193 |
| 2009/0052669 A1* | 2/2009 | Ma | 380/277 |
| 2010/0017855 A1 | 1/2010 | Johnson et al. | |
| 2011/0202763 A1* | 8/2011 | Martin et al. | 713/165 |

FOREIGN PATENT DOCUMENTS

| | | |
|---|---|---|
| EP | 1582982 | 10/2005 |
| WO | 01/06356 | 1/2001 |
| WO | 02/101540 | 12/2002 |
| WO | 2005/045756 | 5/2005 |
| WO | 2008/019237 | 2/2008 |

OTHER PUBLICATIONS

Chen et al., "Data Redundancy and Compression Methods for a Disk-based Network Backup System," 2004, IEEE, pp. 1-8.*
Wang et al., "A Secure and Efficient Desktop Backup and Recovery System," 2007, IEEE, pp. 304-309.*
"Apple Previews Mac OS X Leopard," Aug. 7, 2006 [online] [retrieved on Nov. 26, 2007] Retrieved from the Internet:<URL:http://www.apple.com/pr/library/2006/aug/07leopard.html>, pp. 1-2.
"Aulaclic: Unit 6. The Recycle Bin," Nov. 2005 [online] [retrieved on Nov. 26, 2007] Retrieved from the Internet<URL:http://www.teacherclick.com/winxp/t_6_1.htm>, pp. 1-2.
Bonwick, Jeff, "ZFS The Last Word in File Systems," [online] [retrieved on Jan. 22, 2008] Retrieved from the Internet:<URL:http://opensolaris.org/os/community/zfs/docs/zfs.pdf>, 34 pages.
Bonwick et al., "The Zettabyte File System," [online] [retrieved on Jan. 22, 2008] Retrieved from the Internet:<URL:http://partneradvantage.sun.com/protected/solaris10/adoptionkit/tech/zfs/zfs_overview.pdf>, 13 pages.
Griffiths, R., "Leopard first looks: Time Machine," Aug. 8, 2006 [online] [retrieved on Nov. 23, 2007] Retrieved from the Internet:<URL:http://www.macworld.com/2006/08/firstlooks/leotimemac/index.php?pf=1> pp. 1-2.
International Search Report and Written Opinion, PCT/US2007/074729, Jul. 12, 2007, 11 pages.
International Search Report and Written Opinion, PCT/US2007/074881, Jul. 12, 2007, 11 pages.
Sun Microsystems, Inc., "ZFS On-Disk Specification," Draft: Dec. 9, 2005, [online] [retrieved on Jan. 22, 2008] Retrieved from the Internet:<URL:http://opensolaris.org/os/community/zfs/docs/ondiskformat0822.pdf,>, 55 pages.
Tittel, Ed. "An EAZ Way to Restore Crippled and Inoperable Systems." ChannelWeb. Apr. 25, 2005. http://www.crn.com/white-box/161502165.
"What's New in Word 2002." Wellesly College Information Services Computing Documentation, Jan. 2002, http://www.wellesley.edu/Computing/Office02/Word02/word.02.html. Accessed Aug. 12, 2008.
International Search Report and Written Opinion, PCT/US2007/074653, Aug. 14, 2008, 14 pages.
International Search Report and Written Opinion, PCT/US2008/065146, Oct. 31, 2008, 21 pages.
Engst, "Retrospect 6.0: Powerful Backup Program Adds Panther Compatibility and Enterprise Features", [online] [Retrieved on Jul. 8, 2009]; Retrieved from the Internet URL: http://www.macworld.com/article/31038/2004/06/retrospect6x0.html, 8 pages.
"MSDN Academic Alliance Developer Center, Curriculum Repository Glossary," [online]. Retrieved from the Internet <URL: http://www.academicresourcecenter.net/curriculum/glossary.aspx>, retrieved on Apr. 22, 2009, 4 pages.
International Search Report and Written Opinion, PCT/US2008/066212, Mar. 9, 2009, 26 pages.
International Search Report and Written Opinion, PCT/US2007/074863 Apr. 21, 2009, 20 pages.
Bott, "Windows XP Backup Made Easy," [Online] [Retrieved on Jul. 7, 2009]; Retrieved from the Internet URL: http://www.microsoft.com/windowsxp/using/setup/learnmore/bott_03july14.mspx, 4 pages.
Engst, "Retrospect 6.0: Powerful Backup Program Adds Panther Compatibility and Enterprise Features," [Online] [Retrieved on Jul. 8, 2009]; Retrieved from the Internet URL: http://www.macworld.com/article/31038/2004/06/retrospect6x0.html, 8 pages.
Harder, "Microsoft Windows XP System Restore," [Online] [Retrieved on Jul. 7, 2009] Retrieved from the Internet URL: http://msdn.microsoft.com/en-us/library/ms997627.aspx, 8 pages.
"How to Interpret Windows Installer Logs," [Online] [Retrieved on Dec. 12, 2009] Retrieved from the Internet URL: http://blogs.technet.com/richard_macdonald/archive/2007/04/02/How-to-Interpret-Windows-Installer-Logs.aspx; published Apr. 4, 2007; 6 pages.
"MSDN Academic Alliance Developer Center, Curriculum Repository Glossary," [Online] [Retrieved on Apr. 22, 2009] Retrieved from the Internet URL: http://www.academicresourcecenter.net/curriculum/glossary.aspx, 4 pages.
"StorageSync: Backup, Restore, & Synchronization Software User's Guide", SimpleTech, 2003, 100 pages.
International Search Report and Written Opinion, PCT/US2008/066212, Mar. 9, 2009, 26 pages. (114WO1).
International Search Report and Written Opinion, PCT/US2007/074863 Apr. 21, 2009, 20 pages. (044WO1).
Communication pursuant to Article 94(3) EPC for Application No. EP 07 799 899.5, dated May 14, 2009, 2 pages.
Communication pursuant to Article 94(3) EPC for Application No. EP 07 799 899.5, dated Oct. 7, 2009, 4 pages. (0040EP1).
Posey, Brien M., "Working with the Windows Server 2003 Volume Shadow Copy Service". Published Jun. 24, 2004. http://www.windowsnetworking.com/articles_tutorials/Windows-Server-2003-Volume-Shadow-Copy-Service.html.; 11 pages.
Microsoft-TechNet, "Using Encrypting File System," Nov. 3, 2005, Microsoft, 40 pages.
Microsoft Technet: "Restore a previous version of a file," Jan. 21, 2005, [Online] [Retrieved on Oct. 20, 2011] Retrieved from the Internet URL: http://technet.microsoft.com/en-us/library/cc778220(d=printer,v=WS.10).aspx , pp. 1-2.
Extended International Search Report and Written Opinion, EP 11171738.5, Aug. 29, 2011, 5 pages.
Examination Report from European Application No. 07 813 605.8 dated Oct. 27, 2011, 5 pages.
Examination Report from European Application No. 07 813 540.7 dated Oct. 27, 2011, 5 pages.
Extended European Search Report, European Application No. 11184579.8, Nov. 17, 2011, 6 pages.
Office Action dated Feb. 29, 2012 from related Chinese Application No. 200880024710.0, 11 pages.

* cited by examiner

ELECTRONIC BACKUP AND RESTORATION OF ENCRYPTED DATA

TECHNICAL FIELD

The disclosed implementations relate generally to storing and restoring digital data.

BACKGROUND

Modern graphical user interfaces allow a large number of graphical objects or items to be displayed on a display screen at the same time. Operating systems, e.g., Apple Mac OS®, provide user interfaces in which a number of graphical user interface windows can be displayed, overlapped, resized, moved, configured, and reformatted according to the needs of a user or a particular application. Taskbars, menus, virtual buttons, and other user interface elements provide mechanisms for accessing and activating windows even when they are hidden behind other windows.

With the sophisticated tools available, users are encouraged not only to create and save a multitude of items in their computers, but to revise or otherwise improve on them over time. For example, a user can work with a certain file and thereafter save the file's current version on a storage device. The next day, however, the user could have had second thoughts about the revisions, or could have come up with new ideas, and therefore opens the file again.

The revision process is usually straightforward if the user wants to add more material to the file or make changes to what is there. But it is typically more difficult for a user who has changed his/her mind about changes that were previously made and wants the file returned to a previous version. Application programs for word processing typically let the user "undo" previous edits of a text, at least up to a predefined number of past revisions. The undo feature also usually is configured so that the previously made revisions must be undone in reverse chronological order; that is, the user must first undo the most recently made edit, then the second-most recent one, and so on. If the user saves and closes the document and thereafter opens the document again, it might not be possible to automatically undo any previous edits.

SUMMARY

Systems and methods are provided for storing and restoring digital data. In general, in one aspect, a method is provided. The method includes identifying an encrypted source disk image to be included in a backup operation, the encrypted disk image being encrypted with a first key and generating an encrypted backup disk image, the encrypted backup disk image being encrypted with a second key protected with a randomly generated password. Other embodiments of this aspect include corresponding systems, apparatus, computer program products, and computer readable media.

Implementations of the aspect can include one or more of the following features. Identifying an encrypted disk image can include identifying data encrypted with the first key and a first header, the first header including one or more encryptions of the first key, each of the one or more encryptions being protected by respective first passwords. The first passwords can include a user password and a system password. Generating the encrypted backup disk image can further include encrypting the data of the encrypted disk image with the second key, and generating one or more encryptions of the second key in a second header, each of the one or more encryptions being protected by respective second passwords, where the second passwords include the randomly generated password. The second passwords can also include a user password and a system password.

The aspect can further include performing a next backup of data on the encrypted disk image, including using the randomly generated password to access the encrypted backup disk image, storing additional backup data in the backup disk image from the encrypted disk image, and encrypting the backup disk image including the additional backup data. The backup data can include at least one view of a source disk image. The aspect can further include receiving an input to display a history view, the history view including one or more views of the source disk image decrypting the backup encrypted disk image, and presenting the history view, the history view including one or more visual representations corresponding to the views of the source disk image. The aspect can further include receiving a selection of an item presented in the history view for restoration and restoring the selected item including copying the item from the backup disk image to the source disk image.

In general, in one aspect, a method is provided. The method includes identifying data from a backup disk image on a backup device to restore a storage device as an encrypted disk image, the backup disk image being encrypted using a first encryption key and the backup disk image being associated with a particular user, the backup disk image including one or more versions corresponding to a source disk image, accessing the backup disk image using a system password, copying the version of the backup disk image as an encrypted disk image on the storage device, where the encrypted disk image is encrypted using a second encryption key and includes a header having multiple encryptions of the second encryption key, each encryption of the second encryption key being protected with respective passwords including a respective temporary password associated with the user, capturing a user password, the user password provided by a user to access the encrypted disk image, and replacing the temporary password with the captured user password and using the captured user password to provide access to the encrypted disk image. Other embodiments of this aspect include corresponding systems, apparatus, computer program products, and computer readable media.

Implementations of the aspect can include one or more of the following features. The aspect can further include storing the temporary password in a system keychain. The aspect can further include identifying the temporary password in the system keychain corresponding to the user, using the temporary password, decrypting the second encryption key, and using the captured user password, encrypting the second encryption key. Encrypting the second encryption key with the captured user password can include removing the key encryption associated with the temporary password from the encryption of the second encryption key. Capturing the user password can include identifying a request from a user for access to the encrypted disk image, prompting a request for a password from the user, and capturing the password provided by the user.

In general, in one aspect, a system is provided. The system includes a first device including an encrypted disk image, the encrypted disk image including data encrypted using a first encryption key, and a header including the first encryption key, the first encryption key being encrypted using one or more second encryption keys, each protected with a password. The system also includes a second device including an encrypted backup disk image, the encrypted backup disk image including data encrypted using a third encryption key, and a header including the third encryption key, the third encryption key being encrypted using one or more fourth encryption keys, each protected with a password, the one or more fourth encryption keys including an encryption key protected with a randomly generated password. Other embodiments of this aspect include corresponding systems, apparatus, computer program products, and computer readable media.

Particular embodiments of the subject matter described in this specification can be implemented to realize one or more of the following advantages. Data can be automatically included in backup operations while maintaining user security and without requiring separate user authorization for each backup operation. Encrypted data can be restored transparently so that individual users can be unaware that a restore has occurred.

The details of the various aspects of the subject matter described in this specification are set forth in the accompanying drawings and the description below. Other features, aspects, and advantages of the invention will become apparent from the description, the drawings, and the claims.

DETAILED DESCRIPTION

Figure 1:
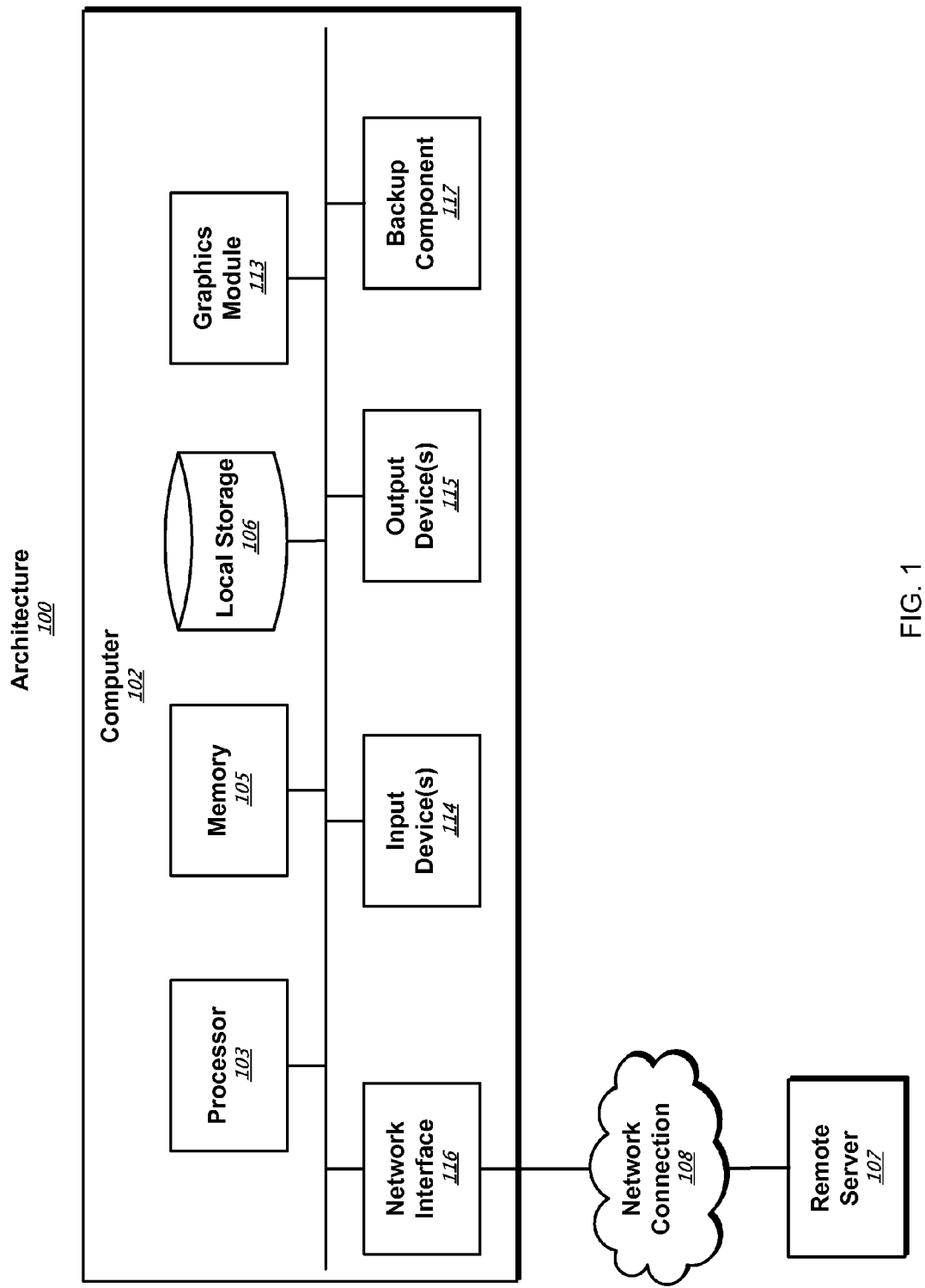
FIG. 1 is a block diagram showing an example system.

FIG. 1 is a block diagram of an example system 100. The system 100 can be used for backup operations including capturing data (e.g., at least one earlier version of a user interface view) and allowing a user to initiate a restoration based on the captured data. As used herein, a view refers to an item, element or other content, capable of being presented in a user interface, that can be subjected to a backup operation by a backup component 117 included in system 100. For example, a user interface view can contain any number of icons, files, folders, application state information and/or machine state information, etc.

The system 100 includes a personal computer 102, communicatively coupled to a remote server 107 using a network interface 116, and a network 108 (e.g., local area network, wireless network, Internet, intranet, etc.). The computer 102 generally includes a processor 103, memory 105, one or more input devices 114 (e.g., keyboard, mouse, etc.), and one or more output devices 115 (e.g., a display device). A user interacts with the system 100 using the input and output devices 114, 115. The system 100 also includes various hardware elements. The system 100 can include hardware, software, and combinations of the two.

The computer 102 also includes a local storage device 106 and a graphics module 113 (e.g., a graphics card) for storing information and generating graphical objects, respectively. The local storage device 106 can be a computer-readable medium. The computer-readable medium can be a machine-readable storage device, a machine-readable storage substrate, a memory device, a composition of matter effecting a machine-readable propagated signal, or a combination of one or more of them.

The local storage device 106 can include one or more disk images. A disk image represents contents of a particular portion or all of a file system as a single file. When mounted, the file system contents of the disk image are accessible. When un-mounted, the contents can be inaccessible. The data on one or more of the disk images can be encrypted.

While electronic backups of encrypted data are described herein with respect to a personal computer 102, it should be apparent that the disclosed implementations can be incorporated in, or integrated with, any electronic device, including without limitation, portable and desktop computers, servers, electronics, media players, game devices, mobile phones, email devices, personal digital assistants (PDAs), embedded devices, televisions, other consumer electronic devices, etc.

Systems and methods are provided for electronic backup and restoration of encrypted data. The systems and methods can be stand-alone or otherwise integrated into a more comprehensive application. In the materials presented below, an integrated system and method for electronic backup and restoration of encrypted data is disclosed.

One of ordinary skill in the art will recognize that the engines, methods, processes and the like that are described can themselves be an individual process or application, part of an operating system, a plug-in, an application or the like. In one implementation, the system and methods can be implemented as one or more plug-ins that are installed and run on the personal computer 102. The plug-ins are configured to interact with an operating system (e.g., MAC OS™ X, WINDOWS XP, LINUX, etc.) and to perform the various functions, as described below.

The system and method for electronic backup and restoration of encrypted data can also be implemented as one or more software applications running on the computer 102. Such a system and method can be characterized as a framework or model that can be implemented on various platforms and/or networks (e.g., client/server networks, wireless networks, stand-alone computers, portable electronic devices, mobile phones, etc.), and/or embedded or bundled with one or more software applications (e.g., email, media player, browser, etc.).

The computer 102 includes a backup component 117 that allows for the storage of versions of the computer's files or other items (e.g., restoring a view including past state of a file, application, application data, parameters, settings, and the like), for example within the local storage 106 or in an external storage repository. For example, the backup component 117 can capture at least one earlier version of a user interface view and allow a user to initiate a restoration based on it. As used herein, a view refers to one or more elements (e.g., items, states, or other content), capable of being presented in a user interface, that can be subjected to a backup operation by the backup component 117. For example, a user interface view can contain any number of icons, files, folders, application state information, and/or machine state information, etc. In one implementation, the backup component 117 also allows a user to select any of the stored versions and use it to initiate a restoration of that version in the computer.

Though discussion is made with reference to restoring data associated with a user interface view, those of ordinary skill will recognize that such a view can be based on various data structures, files, processes, and other aspects of information management. It follows that modification to file structures, data and the like is also contemplated in order to achieve the modification to the user interface view. In other words, while the restoration of the user interface view from one state to another is the most apparent change from the user's perspective, this is accomplished through the corresponding changes in the underlying system content.

Figure 2:
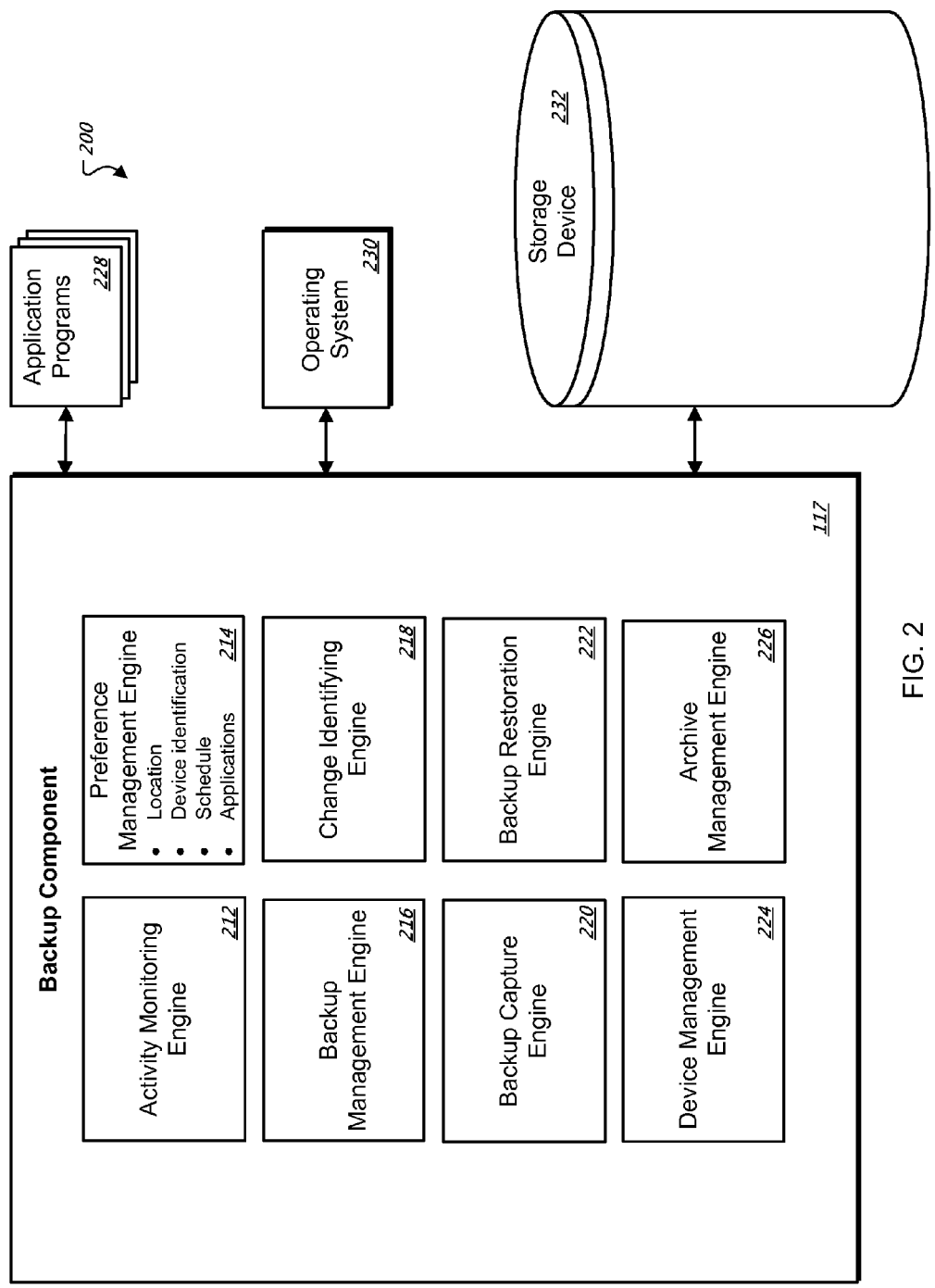
FIG. 2 is a block diagram showing an example of a backup component and interactions with the backup component.

FIG. 2 is a block diagram of an example architecture 200 for enabling the backup and restoration of encrypted data. The encrypted data (e.g., application files, application data, settings, parameters or the like), can be associated with a set of applications 228.

In one implementation, the backup component 117 provides back up and restoration capability for the system 100. Many different items or elements can be the subject of a backup operation in the system 100. For example, folders, files, items, information portions, directories, images, system parameters, playlists, address books, e-mails, e-mail folders, application states, disk images, and the like all can be candidates for inclusion in an archive as backup data. Other types of data can be included as backup data.

In some implementations, the backup component 117 uses a storage device 232. The storage device 232 can be an internal or external resource, or a combination of the two. Any number of local and/or external storage devices can be used by the backup component 117 for storing backup data. In some implementations, the backup component 117 can view storage devices designated for backup data as a single memory bank. In one implementation, the backup component 117 stores the backup data in a format corresponding to a file system structure. Backup data can be stored incrementally during a backup operation where backup data is periodically written to a particular storage device. The backup data can include versions of backup data corresponding to particular disk images in the form of backup disk images.

In one implementation, one copy of original data (e.g., folders, files, items, information portions, directories, images, system parameters, playlists, address books, e-mails, e-mail folders, application states, preferences, and the like) is stored in the system as backup data (e.g., an original version of the data). When one or more subsequent sets of backup data, or versions, of the data are generated through subsequent backup operations, the backup data can contain only the differences between a current data version and the prior backup data, thereby saving storage space.

In some implementations, the storage devices 204 and 232 can be used to store the original backup data as well as links pointing to the original backup data. The links can be hard links which reference, or point to, physical data, or as another example can be symbolic links that reference another file on the storage device (e.g., by name or location).

In one implementation, the backup component 117 runs as a background task on an operating system 230 that is not visible to the user. The backup component 117 can be capable of running across multiple user accounts.

The backup component 117 includes an activity monitoring engine 212. In one implementation, the activity monitoring engine 212 monitors for changes within data, for example, an application view targeted for a backup operation. A change can also include the addition of new files or data or the deletion of the same.

In one implementation, the activity monitoring engine 212 is capable of discerning between a substantive change (e.g. the text within a document has been modified) and a non-substantive change (e.g. the play count within an iTunes playlist has been updated, or several changes cancel each other out) through the activity monitoring engine's interaction with the applications 228. The activity monitoring engine 212 can, for example, create a list of modified elements (e.g., files) to be used when a backup operation is eventually triggered. In one implementation, the activity monitoring engine 212 can monitor the system for periods of inactivity. The activity monitoring engine 212 can then trigger a backup operation during a period of time in which the backup operation will not cause a system slowdown for an active user.

A preference management engine 214 specifies some operating parameters of the backup component 117. In one implementation, the preference management engine 214 contains user-specified and/or system default application parameters for the backup component 117. These can include settings for the details of capturing and storing the views. For example, the preference management engine 214 can determine the frequency of backup operations, the storage location for the backup data, the types of elements (e.g., files or other items) that are eligible for inclusion in backup operations, and the events which trigger a backup operation (periodic or event-driven, etc.).

In one implementation, the preference management engine 214 can detect that a new storage device is being added to the system and prompt the user whether the new storage device should be included as a backup repository. Files and other items can be scheduled for a backup operation due to location (e.g. everything on the C: drive and within D:/photos), a correlation with specific applications (e.g. all pictures, music, e-mail in an inbox, an address book, and system settings), or a combination of strategies. Different types of items can be scheduled to be stored on different devices or on different segments of a storage device during a backup operation.

A backup management engine 216 coordinates the collection, storage, and retrieval of views performed by the backup component 117. For example, the backup management engine 216 can trigger the activity monitoring engine 212 to monitor for activities that satisfy one or more criteria specified in the preference management engine 214 for initiating a backup operation.

A change identifying engine 218 locates specific element (e.g., files or other items) to determine if data associated with the elements has changed. The change identifying engine 218 can be capable of discerning a substantive change from a non-substantive change. For example, the change identifying engine 218 can identify a loss of data associated with a user's current view. In one implementation, the change identifying engine 218 traverses a target set of files or other items, comparing a previous version to the current version to determine whether or not a modification has occurred.

A backup capture engine 220 locates views (e.g., elements, files or other items) that are to be included in a backup operation. The backup capture engine 220 can invoke the activity monitoring engine 212 and/or the change identifying engine 218, for example, to generate a capture list identifying data to be included in a next backup operation. The backup capture engine 220 can then store copies of listed data in one or more targeted storage repositories. The backup capture engine 220 can track multiple versions of elements or items included in the backup repository.

The backup component 117 includes a backup restoration engine 222 to restore previous versions of views (e.g., files or other items). In one implementation, the backup restoration engine 222 provides a user interface (e.g., a graphical user interface) where a user can select the item(s) to be restored. The backup restoration engine 222 can initiate backup operations on one or more data elements or items as directed by a user, the system, or according to a specified or otherwise defined schedule. For example, the user can set up a scheduled backup operation to occur for any number of data files.

A device management engine 224 handles the addition and removal of individual storage devices to be used for archiving backup data. In one implementation, the preference management engine 214 obtains user settings regarding the identification of individual storage devices for use in archiving. These settings can include, but are not limited to, particular segments of individual devices to use, a threshold capacity which can be filled with backup data, and particular devices for storing backup data corresponding to individual applications. The device management engine 224 records the storage device settings obtained by the preference management engine 214, which are used to monitor storage device activity.

In one implementation, the device management engine 224 can alert the user when a new device has been added to the system. In one implementation, the device management engine 224 can alert the user when an archive-enabled device has been removed from the system. In yet another implementation, the device management engine 224 can alert the user when an archive-enabled device is nearing its threshold storage capacity setting.

An archive management engine 226 tracks where backup data is being stored. In one implementation, the archive management engine 226 obtains settings from the preference management engine 224. The settings can include, but are not limited to, methods to be used to remove older or otherwise unnecessary backup data. The settings can establish one or more criteria for deleting backup data from particular backup operations, for instance in the event of storage capacity being reached or on a regular basis. In one implementation, the archive management engine 226 alerts the user when backup data are unavailable, e.g., because a device has gone offline. In another implementation, the archive management engine 226 bars a user from viewing backup data corresponding to another user's backup data due to system permissions settings.

In this example, an external storage device 232 can be used by the backup component 117 for archiving. Any number of storage devices can be used by the backup component 117. For example, a second external storage device can be used as an overflow repository in the event that the device 232 reaches capacity. In another implementation, different storage devices contain the backup version and incremental updates of data belonging to different applications or to different users on the system 100. As another example, two or more storage devices can be responsible for storing backup data from separate applications in the system 100.

In one implementation, the storage device can be network based. For example, the system can store backup data on a remote server (e.g., using a media access control (MAC) address to a storage location). Alternatively, the user can store backup data on a local storage network such as a storage area network (SAN). In one implementation, the remote network storage is a primary storage location for backup data of an archive. In an alternative implementation, the remote network storage is an alternative storage location for backup data. For example, if the user's primary storage location is not available (e.g., a local storage device such as a Firewire drive), then the backup data can be stored on the remote network storage.

In some implementations, the backup data can be compressed in addition to being encrypted. An example of a compression technique is the ZIP file format for data compression and archiving. An example of an encryption technique is the RSA algorithm for public key/private key encryption. Other compression techniques or encryption techniques could be used. In one implementation, the archive storage structure mimics a typical file system structure, such that the archived versions can be perused using a standard file system viewing utility.

In one implementation, if multiple users make use of the backup component 117 on a single system, each user can select to keep separate archives. Access to an individual user's archives can be password protected or otherwise held in a secure manner. In one implementation, the data within the user's archives contain the same read/write permissions as the original data item. In one implementation, the archive management engine 226 inherits the data items' original permissions and indexes the archived contents accordingly. Using these permissions settings, the archive management engine 226 can deny a user access to a copy of a data item when the user would not have authorization to view the original data item. In another implementation, the user can establish permissions or encryption techniques specifically for the backup data archive as a whole. User permissions and encryption settings can be user-selectable from within the preference management engine 214. The preference management engine 214 would then transfer the settings to the archive management engine 226 for storage.

Figure 3A:
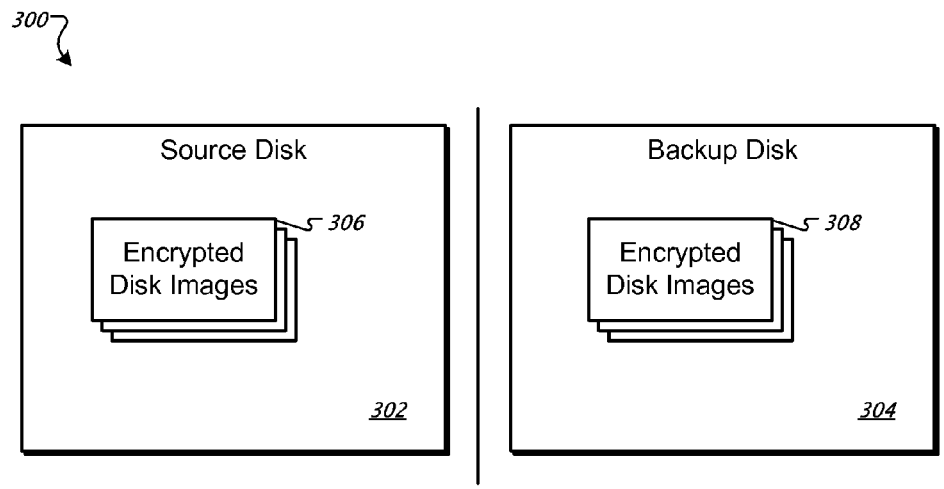
FIGS. 3A-B are block diagrams showing examples of disks and encrypted disk images for backup and restoration.
Figure 3B:
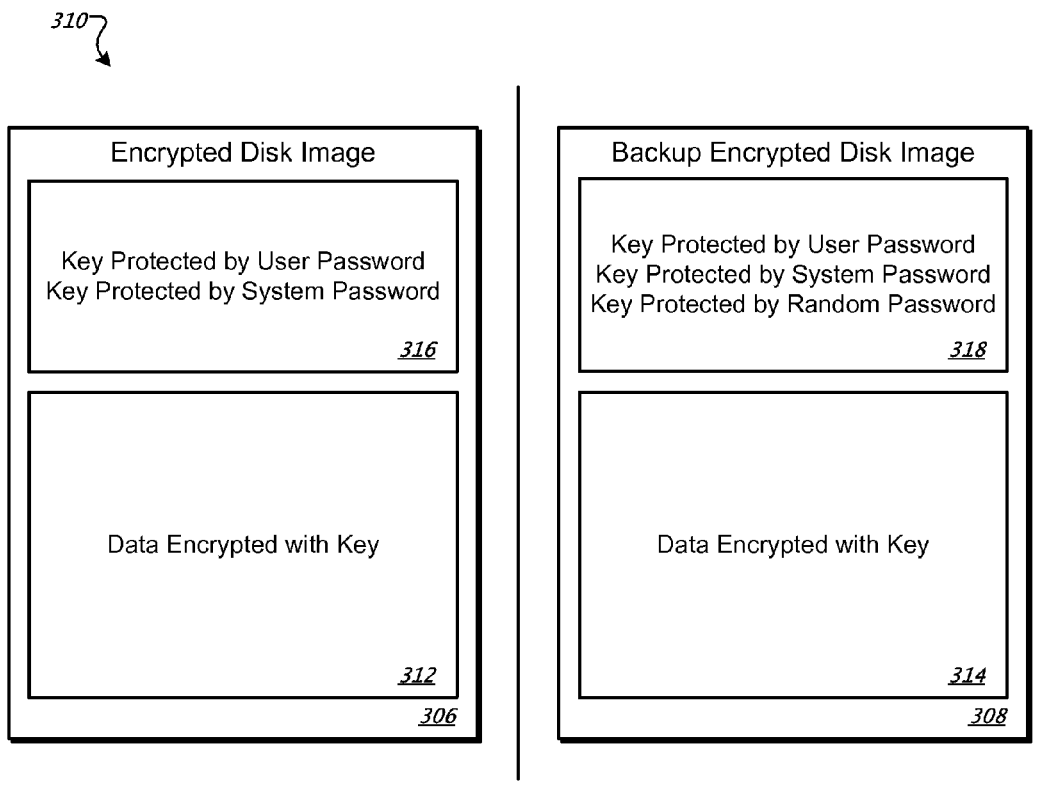

FIGS. 3A-B are block diagrams showing examples of disks 300 and encrypted disk images 310, respectively, for backup and restoration. As shown in FIG. 3A, the disks 300 include a source disk 302 and a corresponding backup disk 304. The source disk 302 can be included, for example, in the local storage 106. Similarly, the backup disk 304 can be included, for example, in the external storage 232. Alternatively, the disks 300 can both be included in some other local storage or an external storage.

The source disk 302 can include one or more encrypted disk images 306. In some implementations, the source encrypted disk images 306 use the Advanced Encryption Standard (AES). However, any suitable encryption technique can be used. Each of the one or more source encrypted disk images 306 can contain any number of data elements (e.g., icons, files, folders, application state information, and/or machine state information, etc.). As discussed above, when unmounted a disk image (unencrypted) represents the data elements as a single file. However, the underlying file structure is generally accessible once the disk image is mounted. This file can be encrypted to form an encrypted disk image.

In some implementations, the source disk 302 can include other data that is also included in backup operations where, for example, the corresponding backup data is stored on the backup disk 304. The other data can include non-encrypted data from the source disk 302 (e.g., files, folders, system data, etc.).

In some implementations, each of the source encrypted disk images 306 corresponds to a particular region of the source disk 302 that is, for example, associated with a particular user of the computer 102, such as a home directory or user profile folder. In one implementation, each source encrypted disk image 306 provides an encrypted form of the disk image data. The data can be encrypted, for example, using a particular encryption key, such that the underlining data is inaccessible without decryption (e.g., using a private key). A different key can be used for each of the encrypted disk images 306. The decrypted disk image can be mounted and accessed (e.g., to read or write data to the disk image).

Each of the source encrypted disk images 306 can have a corresponding backup in the backup encrypted disk images 308. In some implementations, the backup component 117 generates the backup encrypted disk images 308 based on the source encrypted disk images 306, respectively. In other implementations, the backup component 117 generates each backup encrypted disk images 308 using a new encryption key to generate a new encryption of the corresponding source disk image. A particular backup encrypted disk image 308 can include a number of versions of the source disk image, for example, generated though multiple backup operations.

In one implementation, the backup disk 304 also stores other data from the source disk 304, e.g., non-encrypted data. In some implementations, the backup disk 304 can include backup data from other sources than the source disk 302. For example, the backup disk 304 can be located on a server storage device that stores backup encrypted disk images from a number of different source disks located at a number of different network locations (e.g., on different computers).

FIG. 3B shows detail of the structure of the encrypted disk images 310. The encrypted disk images 310 include an example source encrypted disk image 306 and an example backup disk image 308.

The source encrypted disk image 306 includes data 312 that is encrypted using a particular encryption key. For example, a secure file system application (e.g., File Vault provided by Apple, Inc.) can assign a randomly generated encryption key for encrypting the data.

The source encrypted disk image 306 also includes one or more key encryptions 316 of the key used to encrypt the encrypted data 312. The key encryptions 316 can be stored, for example, in a header associated with the encrypted data 312. For example, the key encryptions 316 can include an encryption of the key that is associated with a system password and another encryption of the key that is associated with a user password. For example, each key encryption 316 can be an encryption of the key itself using another public key. Access to the corresponding private key can be controlled, for example, by a particular password (e.g., a user password). Thus, to access the data in the disk image, the key encryption 316 is decrypted to reveal the private key associated with the encrypted data 312. The recovered key can then be used to decrypt the encrypted data 312.

In some implementations, the computer 102 can include a security management system, such as a keychain application that stores and retrieves keys for encrypting and decrypting the key encryptions 316. A keychain can include private keys, passwords, certificates and other data. The keychain application can retrieve the key from a user keychain protected with the user password to decrypt or encrypt the data 312 in response to an input including the user password. Similarly, the keychain application can retrieve the key from a system keychain protected with the system password to decrypt or encrypt the data 312 in response to an input including the system password. Each user can have an associated keychain that stores one or more keys and/or passwords for that user, and which is protected by a user password.

The backup encrypted disk image 308 also includes data 314 that is encrypted using a key. The encrypted data 314 can include data associated with multiple backup operations performed with respect to the data in the encrypted data 312. In other words, the encrypted data 314 can include multiple versions of the data from the source disk image resulting from various backup operations. These multiple versions of the source disk image can be encrypted as a single backup encrypted disk image 308. The key can be a same key as used to encrypt the data 312. Alternatively, the key can be a key generated or assigned, for example, by the backup component 117 for use in generating backup encrypted disk images. In some implementations, access to the encrypted data 312 is protected using one or more encrypted keys 318. Access to the encrypted keys 318 can be provided by one or more passwords. The encrypted keys 318 can be stored, for example, in a header associated with the backup encrypted disk image 308.

For example, the key encryptions 318 can include an encryption of the key that is associated with the system password and another encryption of the key that is associated with the user password. For example, each key encryption 318 can be an encryption of the key itself using another public key. Access to the corresponding private key can be controlled, for example, by a particular password (e.g., a user password). Thus, to access the data in the disk image, the key encryption 318 is decrypted to reveal the private key associated with the encrypted data 314. The recovered key can then be used to decrypt the encrypted data 314.

In some implementations, three separate key encryptions 318 are provided for the key used to encrypt the encrypted data 314. Each of the key encryptions 318 can be protected by a distinct password, for example a system password and user password as described above. In some implementations, a single system password can be used to access a corresponding key encryption 318 on each backup encrypted disk image 308. Additionally, one of the key encryptions 318 can be protected by a randomly generated password. The backup component 117 can use the randomly generated password to access the data 314, for example, to perform backup and restore operations.

In some implementations, the data 312 and 314 are encrypted using one or more public/private key pairs. For example, one private key can be stored in a keychain associated with a system user and protected by the system password. Other private keys can be stored, for example, in keychains associated with particular users and protected by corresponding user passwords. In some implementations, the random password can also be stored in the keychain associated with the particular user. In some implementations, one or more of the keychains are included in backup operations and stored on the backup disk 304. Other data structures can be used to securely store private keys and/or password data.

Figure 4:
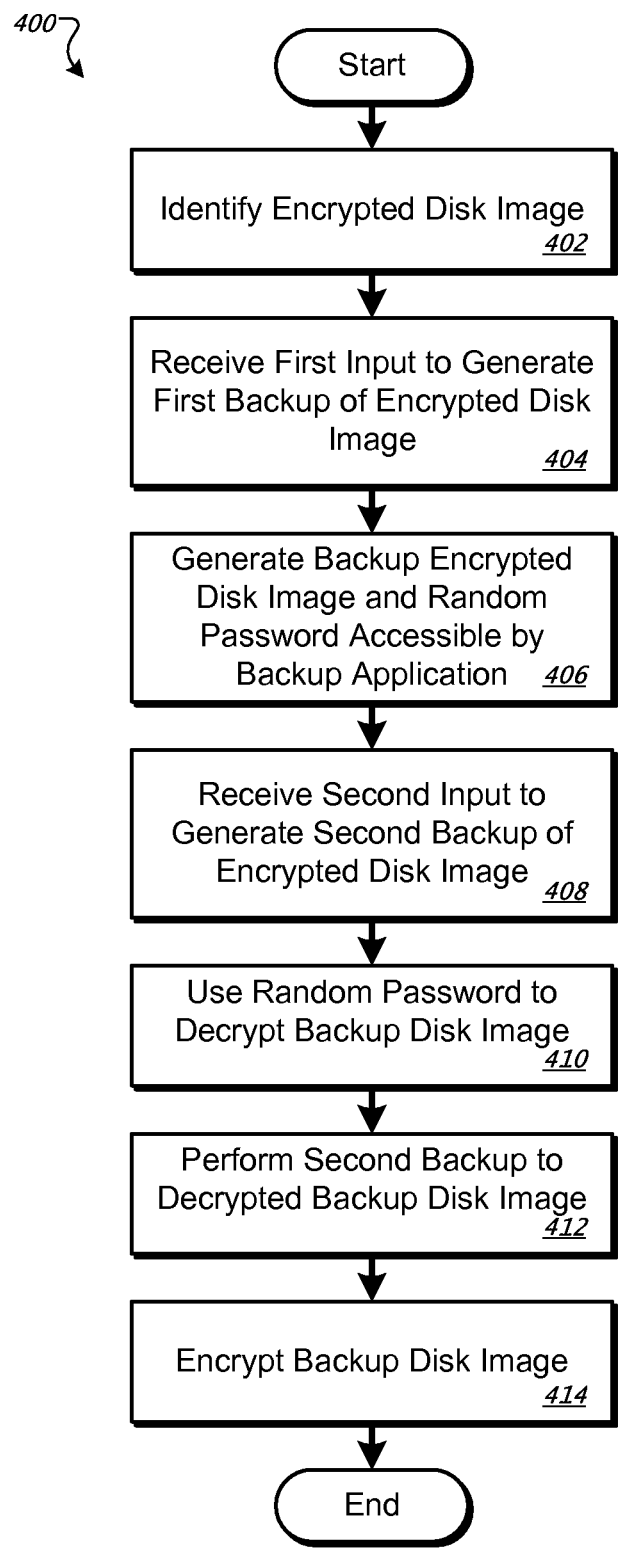
FIG. 4 is a flow chart showing an example of a process for backing up an encrypted disk image.

FIG. 4 is a flow chart showing an example process 400 for backing up an encrypted disk image. For convenience, the process 400 will be described with respect to a system (e.g., system 100) that performs the process 400. The system identifies (402) an encrypted disk image (e.g., encrypted disk image 306) to be included in a backup operation. The encrypted disk image is encrypted using a first key. In some implementations, multiple encrypted disk images can be identified for backup operations.

The system receives (404) a first input to generate a first backup of the encrypted disk image. For example, a user can provide an input within a user interface requesting that a backup operation be performed. Alternatively, the request for backup may be the result of a particular event that occurs in the system, such as the modification of an item, or the request for backup can be in accordance with a specified schedule.

The system generates (406) a backup encrypted disk image (e.g., backup encrypted disk image 308). The encrypted backup disk image is encrypted with a second key. The second key is encrypted and protected with one or more passwords including a randomly generated password. In some implementations, the source disk image is in decrypted form when the user is logged on (e.g., to computer 102), for example, so that the user can access data on the source disk image. As such, the data can be accessed and copied by the backup component to generate the backup encrypted disk image. The backup disk image is then encrypted to form the encrypted backup disk image.

The system receives (408) a second input to generate a second backup of the encrypted disk image. For example, a user can provide an input, an event can occur, or a period of time can elapse indicating a backup operation according to a specified schedule.

The system uses (410) the randomly generated password to access the encrypted backup disk image. For example, the backup component 117 may use the randomly generated password associated with the backup disk image 308 to access a private key used to decrypt a key encryption (e.g., a key encryption 318). The decrypted key is then used to decrypt the encrypted backup data 314.

The system stores (412) additional backup data in the backup encrypted disk image from the source disk image. For example, the backup component 117 can update the backup data stored in the backup disk image. In some implementations, the backup component identifies change information associated with an earlier backup operation and only stores additional backup data reflecting the change information.

In some implementations, the backup data is stored separately within the backup disk image (e.g., as different version of the source disk image) such that, for example, data can be restored from a particular version. For example, the backup component can decrypt the backup encrypted disk image to provide an interface allowing a user to navigate the views of data in the disk image versions in order to identify and restore particular data to the source disk image.

The system encrypts (414) the backup disk image including the additional backup data. For example, the backup component 117 may encrypt the backup data 314 using the same key that was decrypted to access the encrypted data. The key can again be encrypted and protected by the random password.

Figure 5A:
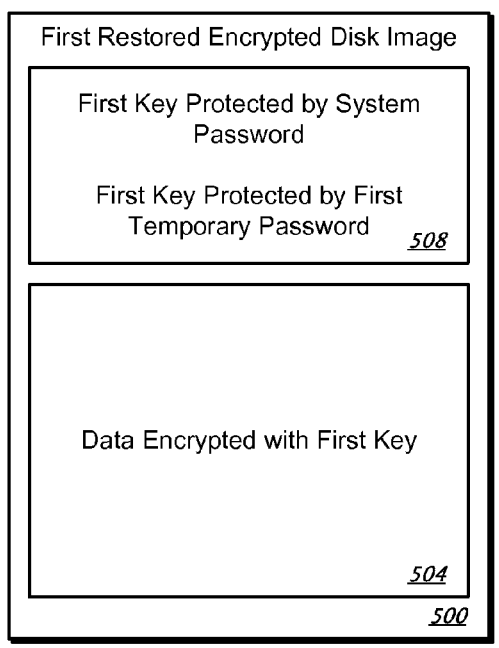
FIGS. 5A-B are block diagrams showing examples of restored encrypted disk images.
Figure 5B:
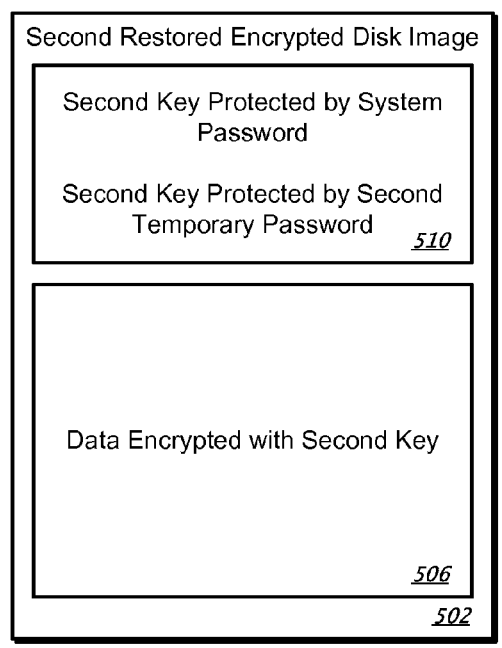

FIGS. 5A-B are block diagrams showing examples of restored encrypted disk images 500 and 502, respectively. For example, the restored encrypted disk image 500 can be associated with a first user and the restored encrypted disk image 502 is associated with a second user. The restored encrypted disk image 500 includes data 504 encrypted using a first key and the restored encrypted disk image 502 includes data 506 encrypted using a second key. The restored encrypted disk images 500 and 502 can be restored from corresponding backup encrypted disk images in response to loss of data on a source disk (e.g., a failure of a storage device). The restored encrypted disk images 500 and 502 can be restored to, for example, one or more new source disks replacing the failed source disk.

In some implementations, the backup component 117 is unable to access the one or more encryption keys used when the corresponding backup encrypted disk images were generated. For example, the user password can be unavailable (e.g., the restore is performed by an administrator without knowledge of the user password). Additionally, the random password may have been stored on a source disk that failed, for example, if the storage device experiences a data corruption or other loss of data. The administrator performing a restore operation can use the system password to access the key, e.g., the key encryption 318 stored in a header of each backup encrypted disk image.

The backup component 117 can copy the data from each backup encrypted disk image to restored disk images on the new source disk, for example, from a version of the source disk image contained within the respective backup encrypted disk image. The backup component can identify respective keys to be used in encrypting the restored data. In particular, the first restored encrypted disk image 500 includes encrypted data 504, encrypted with a first key. In some implementations, the data encrypted with the first key is the same as used to encrypt the data in the corresponding backup encrypted disk image (e.g., the backup component 117 copies the encrypted data). Alternatively, the first key is a new key used to encrypt the data (e.g., the backup component 117 copies decrypted data from the backup disk image and then encrypts the data with a first key, which can be a new key).

The first restored encrypted disk image 500 also includes key encryptions 508. The key encryptions 508 are encryptions of the first key used to encrypt the encrypted data 504. In some implementations, the key encryptions 508 include an encryption of the first key that is protected with the system password. Additionally, the key encryptions 508 can include an encryption of the first key that is protected with a first temporary password. In particular, the first key can be encrypted with another key which is protected by the first temporary password. The first temporary password can be stored on the new source disk, for example, in the system keychain or other data structure.

Similarly, the second restored encrypted disk image 502 includes encrypted data 506, encrypted with a second key. The second restored encrypted disk image 502 also includes key encryptions 510. The key encryptions 510 are encryptions of the second key used to encrypt the encrypted data 506. In some implementations, the key encryptions 510 include an encryption of the second key that is protected with the same system password. Additionally, the key encryptions 510 can include an encryption of the second key that is protected with a second temporary password. In particular, the second key can be encrypted with another key. The second temporary password is then stored in the keychain. In some implementations, each temporary password is associated with a corresponding user (e.g., the first user and the second user) and stored in the same keychain (e.g., the system keychain).

At a later point in time, the backup component 117 can capture a user password corresponding to each user. For example, when a user attempts to access the source encrypted disk image using their password. Once captured, the backup component 117 replaces the corresponding temporary password with the captured user password.

Figure 6:
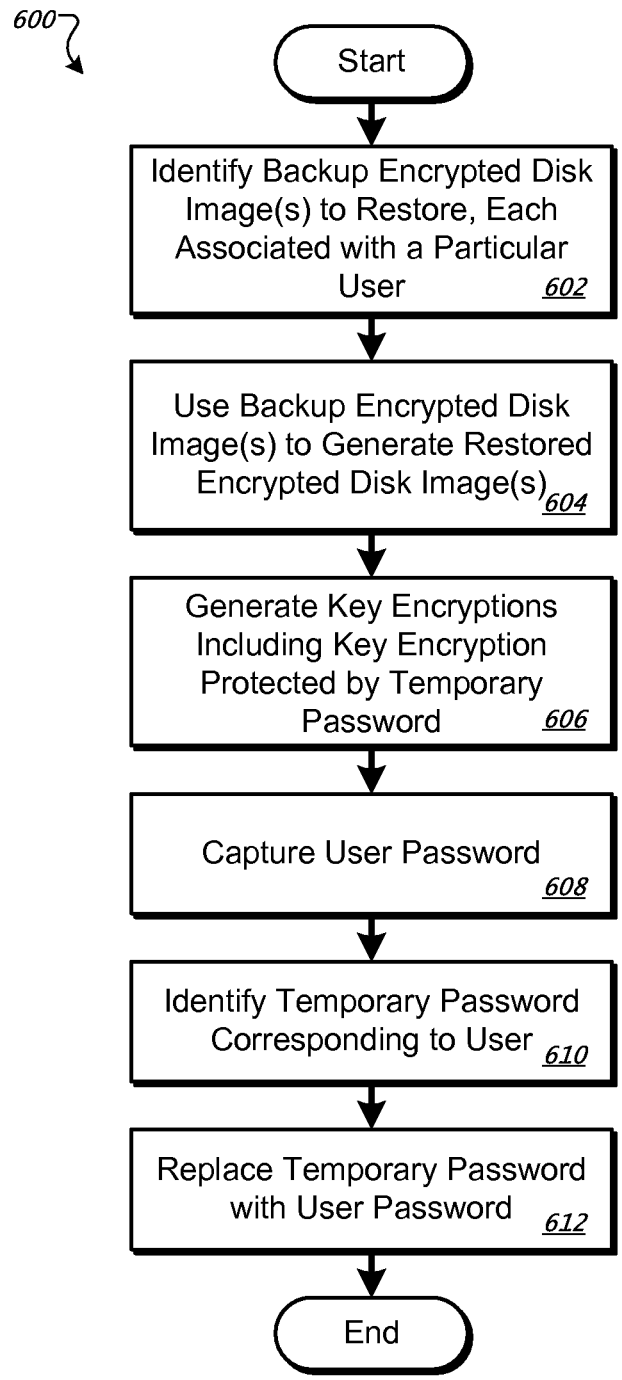
FIG. 6 is a flow chart showing an example of a process for restoring one or more encrypted disk images.

FIG. 6 is a flow chart showing an example of a process 600 for restoring one or more disk images. For convenience, the process 600 will be described with respect to a system (e.g., system 100) that performs the process 600. The system identifies (602) a backup encrypted disk image to restore to a storage device as an encrypted disk image. For example, the system can initiate a restoration in response to a failure of a source disk including one or more encrypted disk images. In some implementations, an administrative user directs the restoration process using the backup component (e.g., backup component 117). The backup disk image is encrypted using a first encryption key and includes one or more key encryptions of the first encryption key. Additionally, the backup disk image is associated with a particular user. For example, the backup component identifies particular backup data from a backup encrypted disk image to restore, such as the backup disk image 308. For example, a particular version (e.g., the most recent version) of the source disk image stored in the backup encrypted disk image can be selected for restoration. In some implementations, multiple backup encrypted disk images can be restored. However, the process 600 is described with respect to a single restored encrypted disk image for simplicity.

The system generates (604) a restored encrypted disk image using the backup encrypted disk image (e.g., restored encrypted disk image 500). In some implementations, the system decrypts the data from the backup encrypted disk image and copies the data, corresponding to the version of the source disk image to be restored, to a restored disk image (e.g., on a new source disk). The system then encrypts the data on the restored disk image with a key (e.g., a randomly generated key).

The system then generates (606) one or more key encryptions of the key used to encrypt the data on the restored disk image. The key encryptions can be stored, for example, in a header associated with the encrypted data. In one implementation, a key encryption is protected using the system password. For example, the key is encrypted with a distinct public key (e.g., one that is randomly generated). The public key can be stored in a system keychain protected by the system password.

In another implementation, a key encryption is protected using a temporary password. The temporary password can be linked to the user associated with the restored encrypted disk image. The temporary password can then be stored on a keychain (e.g., the system keychain). In some implementations, when restoring multiple encrypted disk images (e.g., for multiple users), all the temporary passwords can be stored on the same keychain.

The system captures (608) a user password associated with the restored encrypted disk image. For example, when a user logs onto the system and attempts to access secure data on their encrypted disk image, the user is prompted to input a user password. However, the restored encrypted disk image is not associated with the user password (e.g., there is no longer a key encryption protected using the user password). In some implementations, this password is entered in clear text (i.e., non-encrypted) and can be captured by the backup component.

The system identifies (610) the temporary password corresponding to the user. For example, each temporary password in the system keychain can be linked to a unique identifier of the user. When the user logs on or attempts to access the encrypted disk image, the particular temporary password associated with the user can be identified (e.g., based on user supplied information such as a username).

The system replaces (612) the temporary password with the user password. For example, the system can use the temporary password to decrypt the key encryption protected by the temporary password. A new key encryption can then be generated where the key encryption is protected using the captured user password. For example, the private key corresponding to the new key encryption can then be placed in the user's keychain. In an alternative implementation, the temporary password can be changed to the user password, without new key encryptions being generated, and placed in the user keychain. In some implementations, the system removes the temporary password from the system keychain or otherwise causes the temporary password to become invalid.

The process 600, or individual operations within the process 600, may be repeated for one or more additional restored disk images. Each restored disk image has an associated temporary password. Each temporary password and temporary key may be replaced with an associated captured user password and user key.

In some alternative implementations, the system can copy the entire backup encrypted disk image to a new disk (e.g., a new source disk) as part of a restoration process. Consequently, the restored encrypted disk image includes both the encrypted data and the header including the key encryptions. When the private keys corresponding to the key encryptions are known, it is not necessary to generate the temporary password. Instead, the user can access the encrypted data in the restored encrypted disk image using their user password to directly access the corresponding key encryption.

In the above description, for purposes of explanation, numerous specific details are set forth in order to provide a thorough understanding. It will be apparent, however, to one skilled in the art that implementations can be practiced without these specific details. In other instances, structures and devices are shown in block diagram form in order to avoid obscuring the disclosure.

In particular, one skilled in the art will recognize that other architectures and graphics environments can be used, and that the examples can be implemented using graphics tools and products other than those described above. In particular, the client/server approach is merely one example of an architecture for providing the functionality described herein; one skilled in the art will recognize that other, non-client/server approaches can also be used. Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

An apparatus for performing the operations herein can be specially constructed for the required purposes, or it can comprise a general-purpose computer selectively activated or reconfigured by a computer program stored in the computer. Such a computer program can be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and modules presented herein are not inherently related to any particular computer or other apparatus. Various general-purpose systems can be used with programs in accordance with the teachings herein, or it could prove convenient to construct more specialized apparatuses to perform the method steps. The required structure for a variety of these systems will appear from the description. In addition, the present examples are not described with reference to any particular programming language. It will be appreciated that a variety of programming languages can be used to implement the teachings as described herein. Furthermore, as will be apparent to one of ordinary skill in the relevant art, the modules, features, attributes, methodologies, and other aspects can be implemented as software, hardware, firmware or any combination of the three. Of course, wherever a component is implemented as software, the component can be implemented as a standalone program, as part of a larger program, as a plurality of separate programs, as a statically or dynamically linked library, as a kernel loadable module, as a device driver, and/or in every and any other way known now or in the future to those of skill in the art of computer programming. Additionally, the present description is in no way limited to implementation in any specific operating system or environment.

The subject matter described in this specification can be implemented as one or more computer program products, i.e., one or more modules of computer program instructions encoded on a computer readable medium for execution by, or to control the operation of, data processing apparatus. The instructions can be organized into modules (or engines) in different numbers and combinations from the exemplary modules described. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

While this specification contains many specifics, these should not be construed as limitations on the scope of what may be claimed, but rather as descriptions of features specific to particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The subject matter of this specification has been described in terms of particular embodiments, but other embodiments can be implemented and are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous. Other variations are within the scope of the following claims.

What is claimed is:

1. A method comprising:
    receiving a first request to generate a first backup of an encrypted source disk image;
    identifying the encrypted source disk image to be included in a backup operation, the encrypted source disk image having data encrypted with a first key, wherein the first key is protected using at least a user password, and the encrypted source disk image is decryptable by an authenticated user;
    encrypting the encrypted data of the encrypted source disk image with a second key to form an encrypted backup disk image;
    encrypting the second key with a randomly generated password to form an encrypted second key;
    receiving a second request to generate a second backup of the encrypted source disk image;
    decrypting the encrypted second key using the randomly generated password to obtain a decrypted second key in response to receiving the second request;
    decrypting the encrypted backup disk image using the decrypted second key to form a decrypted backup disk image;
    storing additional backup data in the decrypted backup encrypted disk image; and
    encrypting the decrypted backup encrypted disk image, including the additional backup data, using the decrypted second key,
    wherein the encrypted backup disk image includes a first header including one or more encrypted versions of the first key and a second header including one or more encryptions of the second key; and
    wherein each of the one or more encryptions of the first key being protected by respective first passwords, and each of the one or more encryptions of the second key being protected by respective second passwords, where the second passwords include the randomly generated password.

2. The method of claim 1, where identifying the encrypted source disk image includes identifying data encrypted with the first key.

3. The method of claim 2, where the first passwords include a user password and a system password.

4. The method of claim 1, where the second passwords also include a user password and a system password corresponding to passwords used to protect an encryption of the first key of the encrypted source disk image.

5. The method of claim 1, further comprising:
    performing a next backup of data on the encrypted disk image, including:
        using the randomly generated password to access the encrypted backup disk image;
        storing additional backup data in the backup disk image from the encrypted disk image; and
        encrypting data in the backup disk image including the additional backup data.

6. The method of claim 5, where the backup data includes at least one view of a source disk image.

7. The method of claim 5, further comprising:
receiving an input to display a history view, the history view including one or more views of the source disk image;
decrypting the backup encrypted disk image; and
presenting the history view, the history view including one or more visual representations corresponding to the views of the source disk image.

8. The method of claim 7, further comprising:
receiving a selection of an item presented in the history view for restoration; and
restoring the selected item including copying the item from the backup disk image to the source disk image.

9. The method of claim 1, further comprising:
identifying data from a backup disk image on a backup device to restore a previous encrypted disk image of a storage device as a restored encrypted disk image, an encryption key of the previous encrypted disk image having been protected using an existing user password, the backup disk image being encrypted using a first encryption key and the backup disk image being associated with a particular user, the backup disk image including one or more versions corresponding to a source disk image;
accessing the backup disk image using the randomly generated password;
copying using a computer system a version of the one or more versions of the backup disk image as the restored encrypted disk image on the storage device, where the restored encrypted disk image is encrypted using a second different encryption key and includes a header having multiple encryptions of the second encryption key, each encryption of the second encryption key being protected with respective passwords including a respective temporary password associated with the user, the temporary password being used to protect the encryption of the second encryption key when the existing user password is unavailable to the computer system;
capturing the user password, the user password being provided by a user to access the encrypted disk image; and
replacing the temporary password with the captured user password and using the captured user password to provide access to the restored encrypted disk image including:
using the temporary password to decrypt the second encryption key, and
using the captured user password to encrypt the second encryption key.

10. The method of claim 9, further comprising:
storing the temporary password in a system keychain.

11. The method of claim 10, further comprising:
identifying the temporary password in the system keychain corresponding to the user.

12. The method of claim 11, where encrypting the second encryption key with the captured user password includes removing the key encryption associated with the temporary password from the encryption of the second encryption key.

13. The method of claim 9, where capturing the user password includes:
identifying a request from a user for access to the restored encrypted disk image;
prompting a request for a password from the user; and
capturing the password provided by the user.

14. The method of claim 1, wherein storing additional backup data comprises updating backup data stored in the backup disk image.

15. The method of claim 14, further comprising identifying change information associated with an earlier backup operation and only storing additional backup data reflecting the change information.

16. The method of claim 1, wherein the backup data is stored separately within the decrypted backup disk image as a different version of the source disk image, and data can be restored from a particular version.

17. The method of claim 16, further comprising decrypting the encrypted backup disk image to provide an interface that enables a user to navigate views of data in the source disk image versions to identify and restore particular data to the source disk image.

18. A system comprising:
a processor; and
a memory storing computer executable instructions that, when executed by the processor, cause the processor to perform the steps of:
receiving a first request to generate a first backup of an encrypted source disk image;
identifying the encrypted source disk image to be included in a backup operation, the encrypted source disk image having data encrypted with a first key, wherein the first key is protected using at least a user password, and the encrypted source disk image is decryptable by an authenticated user;
encrypting the encrypted data of the encrypted source disk image with a second key to form an encrypted backup disk image;
encrypting the second key with a randomly generated password to form an encrypted second key;
receiving a second request to generate a second backup of the encrypted source disk image;
decrypting the encrypted second key using the randomly generated password to obtain a decrypted second key in response to receiving the second request;
decrypting the encrypted backup disk image using the decrypted second key to form a decrypted backup disk image;
storing additional backup data in the decrypted backup encrypted disk image; and
encrypting the decrypted backup encrypted disk image, including the additional backup data, using the decrypted second key,
wherein the encrypted backup disk image includes a first header including one or more encrypted versions of the first key and a second header including one or more encryptions of the second key; and
wherein each of the one or more encryptions of the first key being protected by respective first passwords, and each of the one or more encryptions of the second key being protected by respective second passwords, where the second passwords include the randomly generated password.

19. A computer program product, stored on a non-transitory computer readable storage medium, that when executed by a data processing apparatus, cause the data processing apparatus to perform the operations comprising:
receiving a first request to generate a first backup of an encrypted source disk image;
identifying the encrypted source disk image to be included in a backup operation, the encrypted source disk image having data encrypted with a first key, wherein the first key is protected using at least a user password, and the encrypted source disk image is decryptable by an authenticated user;

encrypting the encrypted data of the encrypted source disk image with a second key to form an encrypted backup disk image;

encrypting the second key with a randomly generated password to form an encrypted second key;

receiving a second request to generate a second backup of the encrypted source disk image;

decrypting the encrypted second key using the randomly generated password to obtain a decrypted second key in response to receiving the second request;

decrypting the encrypted backup disk image using the decrypted second key to form a decrypted backup disk image;

storing additional backup data in the decrypted backup encrypted disk image; and encrypting the decrypted backup encrypted disk image, including the additional backup data, using the decrypted second key, wherein the encrypted backup disk image includes a first header including one or more encrypted versions of the first key and a second header including one or more encryptions of the second key; and wherein each of the one or more encryptions of the first key being protected by respective first passwords, and each of the one or more encryptions of the second key being protected by respective second passwords, where the second passwords include the randomly generated password.

* * * * *